United States Patent
Paris et al.

(10) Patent No.: US 10,049,435 B2
(45) Date of Patent: Aug. 14, 2018

(54) CONTROLLING SMOOTHNESS OF A TRANSMISSION BETWEEN IMAGES

(71) Applicant: ADOBE SYSTEMS INCORPORATED, San Jose, CA (US)

(72) Inventors: Sylvain Paris, Jamaica Plain, MA (US); Sohrab Amirghodsi, Seattle, WA (US); Aliakbar Darabi, San Jose, CA (US); Elya Shechtman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 76 days.

(21) Appl. No.: 15/160,932

(22) Filed: May 20, 2016

(65) Prior Publication Data

US 2016/0364846 A1    Dec. 15, 2016

Related U.S. Application Data

(60) Provisional application No. 62/175,361, filed on Jun. 14, 2015.

(51) Int. Cl.
| | |
|---|---|
| *G06T 5/00* | (2006.01) |
| *G06T 3/40* | (2006.01) |
| *G06T 11/60* | (2006.01) |

(52) U.S. Cl.
CPC ............ *G06T 5/002* (2013.01); *G06T 3/4038* (2013.01); *G06T 5/005* (2013.01); *G06T 11/60* (2013.01);
(Continued)

(58) Field of Classification Search
CPC . G06T 5/002; G06T 2207/20221; G06T 7/11; G06T 7/194; H04N 5/272–5/275
See application file for complete search history.

(56) References Cited

U.S. PATENT DOCUMENTS 5,986,771 A * 11/1999 Henderson ............... H04N 1/62
                                                              348/586
6,366,316 B1    4/2002 Parulski et al.
(Continued)

FOREIGN PATENT DOCUMENTS

WO    2005013198 A1    2/2005

OTHER PUBLICATIONS

United Kingdom Search Report dated Dec. 23, 2016 in United Kingdom Patent Application No. GB1610331.9, 5 pages.
(Continued)

*Primary Examiner* — Brian Werner
(74) *Attorney, Agent, or Firm* — Shook, Hardy & Bacon L.L.P.

(57) ABSTRACT

Embodiments described herein are directed to methods and systems for facilitating control of smoothness of transitions between images. In embodiments, a difference of color values of pixels between a foreground image and the background image are identified along a boundary associated with a location at which to paste the foreground image relative to the background image. Thereafter, recursive down sampling of a region of pixels within the boundary by a sampling factor is performed to produce a plurality of down sampled images having color difference indicators associated with each pixel of the down sampled images. Such color difference indicators indicate whether a difference of color value exists for the corresponding pixel. To effectuate a seamless transition, the color difference indicators are normalized in association with each recursively down sampled image.

18 Claims, 11 Drawing Sheets
(4 of 11 Drawing Sheet(s) Filed in Color)

(52) U.S. Cl.
CPC ............... *G06T 2207/10024* (2013.01); *G06T 2207/20192* (2013.01); *G06T 2207/20221* (2013.01)

(56) References Cited

U.S. PATENT DOCUMENTS

| | | | |
|---|---|---|---|
| 6,616,281 B1 * | 9/2003 | Vlahos | H04N 5/2222 |
| | | | 348/586 |
| 7,076,117 B2 | 7/2006 | Biermann et al. | |
| 7,822,289 B2 | 10/2010 | Szeliski | |
| 8,295,632 B2 | 10/2012 | Fattal | |
| 8,379,972 B1 * | 2/2013 | Wang | G06K 9/00 |
| | | | 382/162 |
| 2004/0062439 A1 | 4/2004 | Cahill et al. | |
| 2013/0121618 A1 | 5/2013 | Yadav | |
| 2013/0223758 A1 | 8/2013 | Hou et al. | |
| 2014/0212036 A1 | 7/2014 | Paris et al. | |
| 2014/0219579 A1 | 8/2014 | Lischinski et al. | |

OTHER PUBLICATIONS

Non-Final Office Action dated Sep. 9, 2014 in U.S. Appl. No. 13/815,053, 8 pages.
Notice of Allowance dated Jan. 23, 2015 in U.S. Appl. No. 13/815,053, 9 pages.

\* cited by examiner

CONTROLLING SMOOTHNESS OF A TRANSMISSION BETWEEN IMAGES

CROSS-REFERENCE TO RELATED APPLICATIONS

This application claims the benefit of U.S. Provisional Application No. 62/175,361, filed Jun. 14, 2015, the entirety of which is incorporated herein by reference. This application is also related by subject matter to the disclosure of U.S. application Ser. No. 13/815,053, filed Jul. 31, 2014, entitled "Pyramid Collapse Color Interpolation."

BACKGROUND

In an imaging environment, such as an imaging or a photograph editing application (e.g., Adobe® Photoshop®), pixel colors or color adjustments are frequently determined using undefined pixels where some information associated with those pixels is not initially known. For instance, in some cases, certain images are incomplete and result in portions of the image that are unclear, missing, and/or otherwise lack information. By way of example, images received over a network or captured via a camera may degrade and lack information for all pixels of the image resulting in unclear, blurry and/or other incomplete images. These images include a number of undefined pixels where information for those respective pixels is not known and a number of defined pixels where information for those respective pixels is known.

In other cases, compositing images or pasting an image over a background can utilize initially undefined pixels that lack color difference information to blend or transition the pixel colors. By way of example, a user may desire to paste an image, or portion thereof (e.g., foreground image) over a background image. In such a case, color modifications may be made in association with pixels, such as foreground pixels, in an effort to blend the images. The color modifications can be determined using a number of undefined pixels where color difference information for those respective pixels is not known and a number of defined pixels where color difference information for those respective pixels is known.

In some instances, a system of linear equations may be used to mathematically derive the unknown information of the undefined pixels. The mathematically derived information may then be filled into the undefined pixels to complete the degraded image. Deriving and solving the system of linear equations can require significant computing resources and can require an excessive amount of time to solve for the undefined pixels.

Further, in conventional implementations used to derive color modification information for initially undefined pixels, the transition in color of pixels across a boundary between a foreground image pasted in association with a background image can be visually recognized, that is, the seam can be observed between the images. For example, the pixel modifications made from the border of the foreground image inward may change too quickly thereby inhibiting a smooth transition. Such an apparent transition between images is oftentimes an undesirable result as a seamless transition between the pasted region and the background image is desired by a user so that the resulting image appears unaltered.

BRIEF SUMMARY

Disclosed are embodiments for recursively modifying an image with defined and undefined pixels to generate a modified image with a seamless composition. In this regard, embodiments described herein facilitate controlling smoothness of a transition between a foreground image (image to be pasted) and a background image. At a high level, a boundary associated with a position a foreground image is to be pasted or composited relative to a background image is identified. Differences of color values of pixels between the foreground image and the background image along the boundary are determined. The color differences along with a color difference indicator indicating that color difference information is known are used to initially represent pixels along the boundary, while other pixels are initially represented with zero values indicating undetermined color differences between the foreground image and background image. Such data can be used to recursively down sample by a sampling factor to produce down sampled images. To facilitate a seamless and more gradual transition between a foreground image and background image, the color differences and color difference indicators can be normalized at each recursive down sampling instance using a greatest color difference indicator at that recursive down sampling instance or level. Upon determining the last down sampled image, the last down sampled image can be recursively up sampled to generate a set of final color difference values for the pixels that are used to produce a seamless composition with a seamless transition between the foreground image and the background image.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE SEVERAL VIEWS OF THE DRAWING

The patent or application file contains at least one drawing executed in color. Copies of this patent or patent application publication with color drawing(s) will be provided by the Office upon request and payment of the necessary fee.

These and other features, aspects, and advantages of the present disclosure are better understood when the following Detailed Description is read with reference to the accompanying drawings, where.

DETAILED DESCRIPTION OF THE INVENTION

Figure 1:
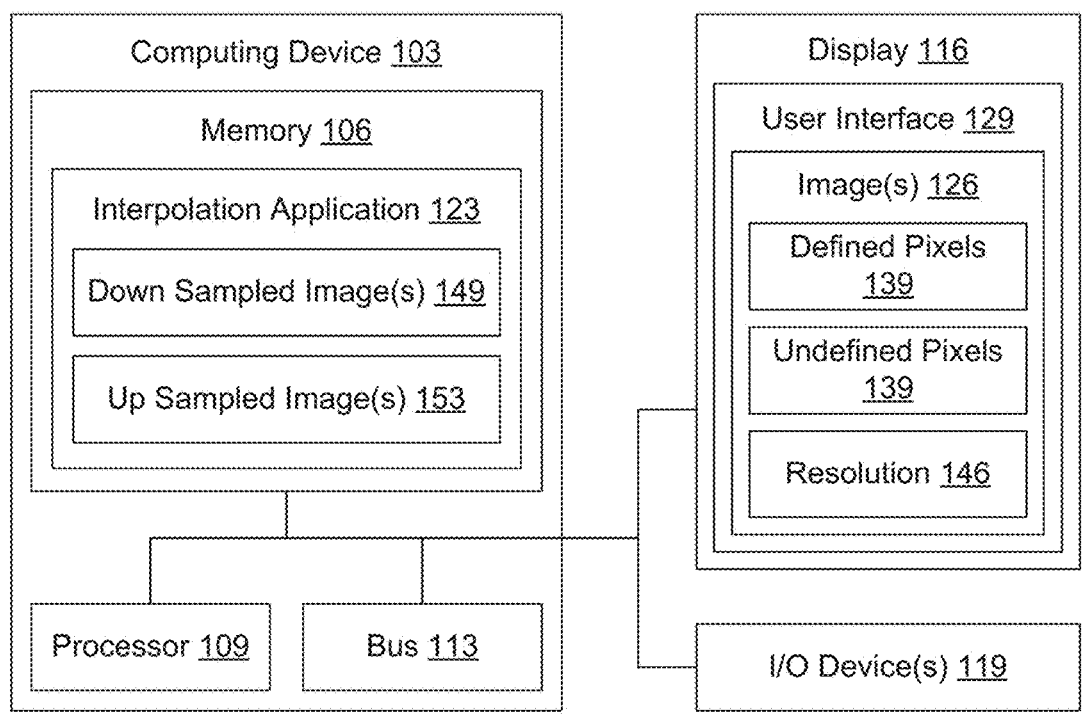
FIG. 1 is a block diagram depicting exemplary computing devices in an exemplary computing environment for implementing certain embodiments.

In an imaging environment, such as an imaging or a photograph editing application (e.g., Adobe® Photoshop®), users often desire to paste an image, or portion thereof (e.g., foreground image) over a background image. For example, a user might want to add an image of an animal into a background image (e.g., scenery) that does not include that animal. In conventional implementations, the transition in color of pixels across a boundary between a foreground image and a background image can be visually recognized, that is, the seam can be observed between the images. For example, the pixel modifications made from the border of the foreground image inward may change too quickly thereby inhibiting a smooth transition. The user, however, generally desires to have a smooth transition between the foreground image and the background image. In this regard, the pixels on the border of the pasted region (foreground image) are desired to match the background image such that the transition between the pasted region and the background image are seamless.

Embodiments of the present invention facilitate a smooth transition between a foreground image and a background image. In this regard, in accordance with pasting an image over the background or generating a composite image, the transition between the foreground image and background image is seamless and generally not apparent to a user. Advantageously, embodiments of the present invention control transition smoothness and perform such smoothness efficiently while utilizing minimal computing resources.

At a high level, a boundary associated with a position a foreground image is to be pasted or composited relative to a background image is identified. Differences of color values of pixels between the foreground image and the background image along the boundary are determined. The color differences along with a color difference indicator indicating that color difference information is known are used to initially represent pixels along the boundary, while other pixels are initially represented with zero values indicating undetermined color differences between the foreground image and background image. Such data can be used to recursively down sample by a sampling factor to produce down sampled images.

At each down sampling instance or down sampling level, a largest color difference indicator among color difference indicators associated with pixels is identified and used to normalize the pixels. In particular, each of the color difference values and color difference indicators associated with the various pixels can be divided by the largest color difference indicator to normalize the pixels at that down sampling level. In some cases, normalization effect can be augmented by a predetermined factor. Upon determining the last down sampled image, the last down sampled image can be recursively up sampled to generate a set of final color difference values for the pixels that are used to produce a seamless composition with a seamless transition between the foreground image and the background image. In such an implementation, the values of the foreground pixels are modified so that those on the boundary have the same value as the corresponding background and such that the modified foreground maintains similarity to the original foreground.

The approaches described herein provide the seamless composition using less computing resources than the system using linear equations. These illustrative examples are given to introduce the reader to the general subject matter discussed here and are not intended to limit the scope of the disclosed concepts. The following sections describe various additional embodiments and examples with reference to the drawings in which like numerals indicate like elements.

Methods and systems are also disclosed for quickly and accurately determining pixel information for undefined pixels of an incomplete image. The disclosed embodiments can require less computing resources than previous methods and can determine the undefined pixels at a faster rate. Recursive interpolation of the incomplete image combined with extraction from interpolated images at recursive instances, as described herein, provides the pixel information for the undefined pixels. The resulting image is a seamless composition with fewer or no gaps in the image with missing pixel information. The approaches described herein provide the seamless composition using less computing resources than the system using linear equations. Disclosed are embodiments for receiving an image (126 in FIG. 2) with a number of undefined pixels (206 in FIG. 2) and a number of defined pixels (203 in FIG. 2) and applying the recursive approach disclosed herein to create a version of the image (FIG. 3) with pixel information for the undefined pixels. For example, the undefined pixels may be filled in with a recursive average of the information associated with any adjacent pixels. In one embodiment, an interpolation application interpolates the information for the undefined pixels by recursively down sampling the received image by a factor of two to create a Gaussian pyramid until there are no undefined pixels remaining in the resulting down sampled image. The interpolation application then recursively up samples the down sampled images by a factor of two starting from the smallest down sampled image to produce up sampled images. At each recursive instance, the interpolation application pastes the up sampled image together with the next down sampled image and fills in the undefined pixels of the down sampled image with the corresponding defined pixels of the up sampled image. The interpolation application continues up sampling the images of the pyramid until all of the down sampled images have been processed. The resulting image represents a modified version of the original image where the undefined pixels of the original image are filled in with the recursive averages of the adjacent defined pixels.

These illustrative examples are given to introduce the reader to the general subject matter discussed here and are not intended to limit the scope of the disclosed concepts. The following sections describe various additional embodiments and examples with reference to the drawings in which like numerals indicate like elements.

FIG. 1 is a block diagram depicting an exemplary computing device in an exemplary computing environment for implementing certain embodiments. The methods and systems disclosed herein are also applicable on other computing systems and environments. The environment shown in FIG. 1 includes a computing device 103 having a memory 106, a processor 109, a bus 113, a display 116, and a plurality of input/output devices 119. In one embodiment, the input/output device 119 may include a number of external or internal devices such as a mouse, a CD-ROM, DVD, a keyboard, a display, audio speakers, one or more microphones, a stylus, or any other input or output devices. Additionally, the computing device 103 may be a personal computing device, a mobile device, or any other type of electronic devices appropriate for providing one or more of the features described herein. Further, the computing device 103 may be a touch computing device, such as a tablet computer, that includes a touch screen for receiving input. In this example, the input/output device 119 also includes the touch screen for receiving input.

As used here, the term "device" refers to any computing or other electronic equipment that executes instructions and includes any type of processor-based equipment that operates an operating system or otherwise executes instructions. A device will typically include a processor 109, which may comprise one or more processors, that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tables, laptop computers, tablet computers, Internet appliances, other processor-based devices, and television viewing devices. The exemplary computing device 103 may be used as special purpose computing devices to provide specific functionality offered by applications and modules.

As used herein, the term "application" refers to any program instructions or other functional components that execute on a device. An application may reside in the memory 106 of a device that executes the application. As is known to one of skill in the art, such applications may be resident in any suitable computer-readable medium and execute on a suitable processor. For example, as shown the computing device 103 has a computer-readable medium such as the memory 106 coupled to the processor 109 that executes computer-executable program instructions and/or accesses stored information. Such a processor 109 may include a microprocessor, an ASIC, a state machine, or other processor, and can be of any number of computer processors. Such processors include, or may be in communication with, a computer-readable medium which stores instructions that, when executed by the processor, cause the processor to perform the steps described herein.

As used herein, the term "down sampling" refers to an image operation that decreases the number of pixels in an image by filtering and then removing the pixels from the image to create the down sampled image. Any number of filters may be used to implement the filtering as known in the art. For example, some filters may be faster than others but produce a filtered image that is of a lesser quality than a slower filter. As an example, a 3×3 tent filter is a faster filter than a 5×5 Gaussian filter but produces a filtered image that is of a lesser quality in relation to the filtered image produced from the Gaussian filter.

As used herein, the term "up sampling" refers to an image operation that increases the number of pixels in an image by adding pixels to the image and then filtering the image to create the up sampled image. Any number of filters may be used to implement the filtering as known in the art. For example, some filters may be faster than others but produce a filtered image that is of a lesser quality than a slower filter. As an example, a 3×3 tent filter is a faster filter than a 5×5 Gaussian filter but produces a filtered image that is of a lesser quality in relation to the filtered image produced from the Gaussian filter.

As used herein, the term "over function" refers to a compositing operator that overlays and/or pastes two images on top of each other and identifies undefined pixels in a first image to be replaced with corresponding defined pixels in the second image. For example, the over function may paste undefined pixels of a foreground image onto a background image, or vice versa.

The memory 106 represents a computer-readable medium that may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

In one embodiment, the memory 106 includes an interpolation application 123 and/or other applications. The interpolation application 123 receives an image 126 and fills in undefined portions of the image with a smooth and blended transition of colors from the non-undefined portions of the image via interpolation by producing a number of down sampled images 149 and a number of up sampled images 133, as will be described. Additionally, an application such as a browser may render a user interface 129 on the display 116 associated with the computing device 103. The user interface 129 may depict the image 126. The image 126 may include a number of defined pixels 139 and a number of undefined pixels 143. For example, defined pixels 139 may be any pixel of the image 126 with known information, such as, a color value. The undefined pixels 143 may be any pixel of the image 126 with unknown information. Additionally, each image 126 has a resolution 146 that may be defined by the number of pixels (defined pixels 139 and undefined pixels 143) on each of the dimensions of the image 126.

In one embodiment, the interpolation application 123 fills in the undefined pixels 143 of the image 126 by repeatedly averaging the information of any defined pixels 139 adjacent to each of the undefined pixels 143. For example, the interpolation application 123 recursively down samples the image 126 to create a Gaussian pyramid that includes number of down sampled images 149. In one embodiment, the interpolation application 123 down samples the original image 126 by a factor of two such that the first down sampled image 149 is half of the resolution 146 as the original image 126. For instance, the interpolation application 123 may create the first down sampled image 149 from every other pixel of the original image 126. Accordingly, a number of the defined pixels 139 and a number of the undefined pixels 143 may not appear in the first down sampled image 149. In another embodiment, the interpolation application 123 may down sample the original image 126 by a factor other than two. For instance, the interpolation application 123 may down sample the original image 126 by a factor of three or any other factor. In the example where the factor is three, the interpolation application 123 down samples the original image 126 by removing every third pixel from the original image 126.

On the next recursive instance, the interpolation application 123 down samples the first down sampled image 149 to create a second down sampled image 149 where the second down sampled image 149 is half of the resolution 146 as the first down sampled image 149. The interpolation application 123 proceeds with recursively down sampling by a factor of two (or by the same factor as the previous down sampling) until there are no more undefined pixels 143 remaining in the down sampled image 149. For instance, the interpolation application 123 may determine whether there are any undefined pixels 143 in the down sampled image 149 upon each recursive instance of down sampling. Upon determining that there are no undefined pixels 143 in the down sampled image 149, the interpolation application 123 stops the recursive down sampling. The last down sampled image 149 in the set of recursively down sampled images 149 has the smallest resolution 146 with respect to the other down sampled images 149 and therefore is the smallest down sampled image 149. Additionally, each one of the down sampled images 149 produced during the recursive down sampling may be stored in the memory 106.

The interpolation application 123 then recursively up samples the down sampled images 149 to create a modified version of the original image 126 with all of the undefined pixels 143 filled in based at least in part on the defined pixels 139. The modified version of the original image 126 is void of any undefined pixels 143 thereby embodying a seamless composition full of defined pixels 139. In one embodiment, the interpolation application 123 initiates the up sampling with the smallest down sampled image 149. The smallest down sampled image 149 lacks any undefined pixels 143 as previously discussed. The interpolation application 123 up samples the smallest down sampled image 149 by a factor of two (or by another factor previously used for down sampling) to create a first up sampled image 153. In one embodiment, the first up sampled image 153 has twice the resolution 146 of the smallest down sampled image 149. For example, each pixel of the smallest down sampled image 149 is up sampled to produce a 2×2 block of pixels in the first up sampled image 153. Additionally, only defined pixels 139 are present in the smallest down sampled image 149 and therefore only defined pixels 139 will be present in the first up sampled image 153.

Next, the interpolation application 123 implements an over function to paste the second smallest down sampled image 149 on top of the first up sampled image 153. As discussed above, the smallest down sampled image 149 may include one or more undefined pixels 143. In one embodiment, the interpolation application 123 implements the over function by pasting the first up sampled image 153 over the second smallest down sampled image 149. For example, the first up sampled image 149 is the "foreground" while the second smallest down sampled image 149 is the "background." To this end, the interpolation application 123 identifies portions of the second smallest down sampled image 149 that include undefined pixels 143 and pastes the defined pixels 139 in the corresponding portion of first up sampled image 153 onto the second smallest down sampled image 149 to create a modified second smallest down sampled image 149. The modified second smallest down sampled image 149 does not include any undefined pixels 143 upon implementation of the over function. For instance, the undefined pixels 143 are replaced by the corresponding defined pixels 139 from the first up sampled image 153. In one embodiment, the defined pixels 139 from the first up sampled image 153 represents an average of the pixels adjacent to the undefined pixels 143 as determined from the smallest down sampled image 149.

On the next recursive instance, the interpolation application 123 up samples the modified second smallest down sampled image 149 by a factor of two (or by another factor previously used for up sampling) to create a second up sampled image 153. The second up sampled image 153 does not include any undefined pixels 143. The interpolation application 123 then implements the over function by pasting the second up sampled image 153 over the third smallest down sampled image 149 and replacing any portions of the third smallest down sampled image 149 that include undefined pixels 143 with defined pixels 139 from the corresponding portion of the second up sampled image 153 to create a modified third smallest down sampled image 149. The interpolation application 123 continues recursively up sampling and implementing the over function on the down sampled images 149 up the pyramid until all of the down sampled images 149 have been processed. For example, all of the down sampled images 149 will be processed when the largest down sampled image 149 is up sampled and used to implement the over function to create the modified largest down sampled image 149. The modified largest down sampled image 149 represents the version of the original image 126 with all of the undefined pixels 143 recursively filled in with averages of any adjacent defined pixels 139 to create the smooth and blended version of the original image 126.

The functionality of the interpolation application 123 may be described in pseudo code as follows. In one embodiment, the interpolation application 123 implements the functionality of the Interpolate( ) function, the InterpolateRec( ) function and the Over( ) function. The Interpolate( ) function is the driver function and may be described as follows:

Interpolate (Image X with alpha A):
P<–X*A';
(P', A')<–InterpolateRec (P, A);
X'<–P'/A';
return (X',1);

In the function described above, the image is represented by 'X' and the alpha is represented by 'A.' Alpha may be a vector having a length and/or a matrix having a size that corresponds to the number of pixels in the image X. Each entry in the vector, matrix, and/or other mathematical structure may indicate whether the information of the respective pixel in the image X is known. For instance, an alpha value of O indicates that no information of the pixel associated with that particular entry in the mathematical structure is known. Similarly, an alpha value of 1 indicates that the information of the pixel associated with that particular value in the mathematical structure is known. In one embodiment, the alpha may be represented by a Boolean value.

The Interpolate( ) function first calls for a premultiplied alpha (P) for notational convenience where any color information for unknown pixels is discarded. Next, the Interpolate( ) function calls the InterpolateRec( ) function that implements the recursive down sampling, up sampling and pasting of the image X to produce modified image X', as will be described. The value returned from the InterpolateRec( ) function is stored as (P', A'). The modified image X' is then derived by moving back to the non-premultiplied alpha by dividing by A' and then returning the modified image X' that includes only defined pixels 139 (i.e., has an alpha of 1).

The InterpolateRec( ) function may be described as follows:

InterpolateRec(Image P with alpha A):
If size(P)=1×1:
return (P, A);
(Ps,As)=Downsample(P,A)
(Ps',As')=InterplateRec(Ps,As);
return Over ((P,A), Upsample (Ps', As'));

In the function described above, the InterpolateRec( ) function receives the image P which is the premultiplied alpha P version of the image X and the alpha A associated with the premultiplied alpha P version. The Interpolate Rec( ) function then determines whether the pixel size of the image P is equal to a 1×1 resolution. For example, the recursive down sampling may have reduced the size of the image to only one pixel in size. If the InterpolateRec( ) function determines that the resolution of the image P is 1×1, then the recursion is complete and (P, A) is returned. In another embodiment, the InterpolateRec( ) function may determine whether any of the pixels of the image P are undefined pixels 143. If the InterpolateRec( ) function determines that no undefined pixels 143 are present, then the recursion is complete and (P, A) is returned.

If the InterpolateRec( ) function instead determines that the resolution of the image P is not 1×1 or that the image P includes undefined pixels 143, then the InterpolateRec( ) function proceeds to implement a down sampling function on (P, A). In one embodiment, the down sampling function reduces the size of the image P by a factor of 2 (i.e., reduces the resolution of the image P by half) to produce a down sampled result (Ps, As). Next, the InterpolateRec( ) function recursively calls itself with (Ps, As) as the input image and alpha and stores the result as (Ps', As') until the condition as defined by the if statement is satisfied.

Upon satisfying the condition to stop the recursive down sampling, the InterpolateRec( ) function next implements the Over( ) function using the returned (P, A) value and the result of up sampling the image identified as (Ps', As'). In one embodiment, the up sampling function increases the size of the image Ps' by a factor of 2 (i.e., multiplies the resolution of the image Ps' by two) to produce the up sampled image, as described above. The Over( ) function can be any one of a number of standard over( ) functions known in the art. As one example, the Over( ) function may be implemented as:

Over (Image Fg with alpha FgA, image Bg with alpha BgA):
return (Fg+(1−FgA)*Bg, FgA+(1−FgA)*BgA);

In the function above, Fg represents the foreground image, FgA represents the alpha of the foreground image Fg, Bg represents the background image, and BgA represents the alpha of the background image Bg. As another example, the Over( ) function may be implemented as:

---

Over (image Fg with alpha FgA, image Bg with alpha BgA):

for image location i:
  if FgA(i) > 0:
    R(i)~Fg(i);
    RA(i) ~ FgA(i);
  else:
    R(i)~Bg(i);
    RA(i) ~ BgA(i);
  return (R, RA);

---

In the function above, the image location i represents a pixel location within the foreground image FgA. The R represents the returned image that is produced by the Over( ) function. A number of other Over( ) functions may be known in the art and may be interchangeable with the Over( ) functions described above.

Figure 2:
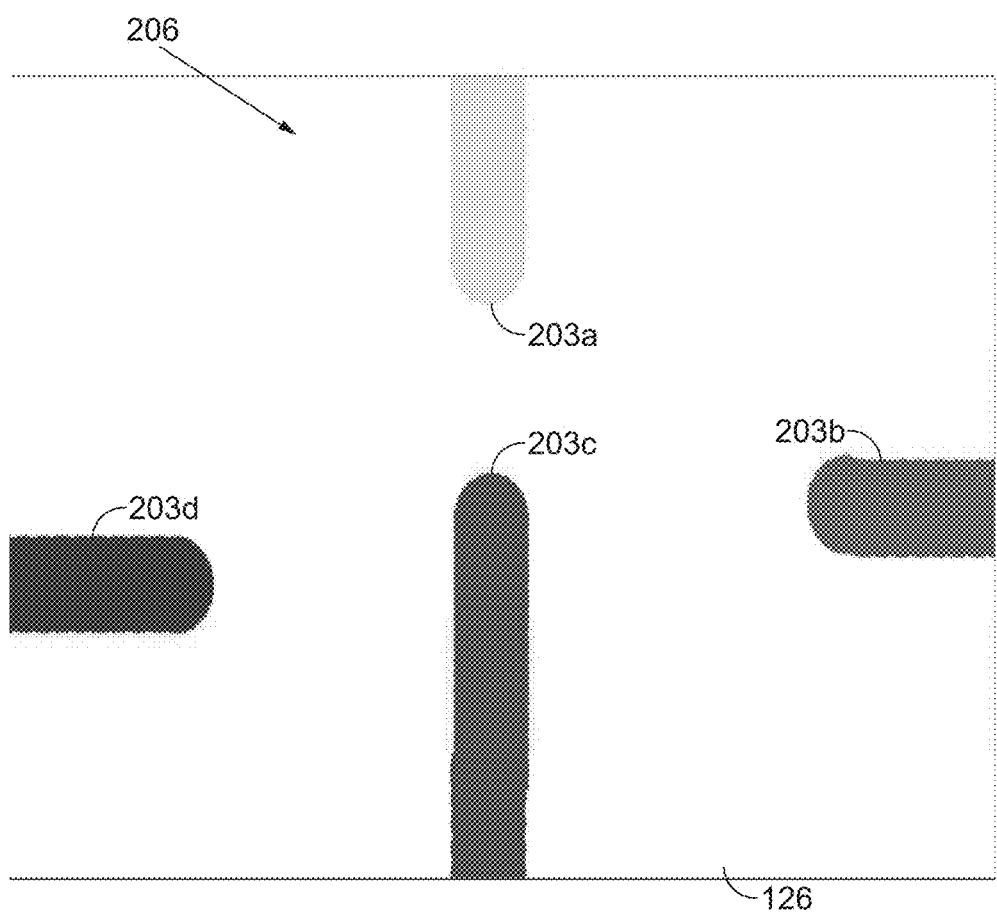
FIG. 2 is an illustration of an image that includes a number of undefined pixels and a number of defined pixels.

FIG. 2 shows one example of a user interface 129 (FIG. 1) according to certain embodiments of the present disclosure that is rendered on the display 116. The user interface 129 shown in FIG. 2 includes an image 126 with a color portions 203a, 203b, 203c, and 203d, and other portion 206. For example, the color portions 203a, 203b, 203c and 203d include defined pixels 139 (FIG. 1) where the pixels that form the respective color portions include color information. The other portion 206 includes only undefined pixels 143 (FIG. 1) where the pixels that form the other portion include no color information. In this example, the color portion 203a includes yellow colored defined pixels 139, the color portion 203b includes blue colored defined pixels 139, the color portion 203c includes blue colored defined pixels 139 and the color portion 203d includes red colored defined pixels 139. The other portion 206 does not include any defined pixels 139 and thus may not be visible.

Figure 3:
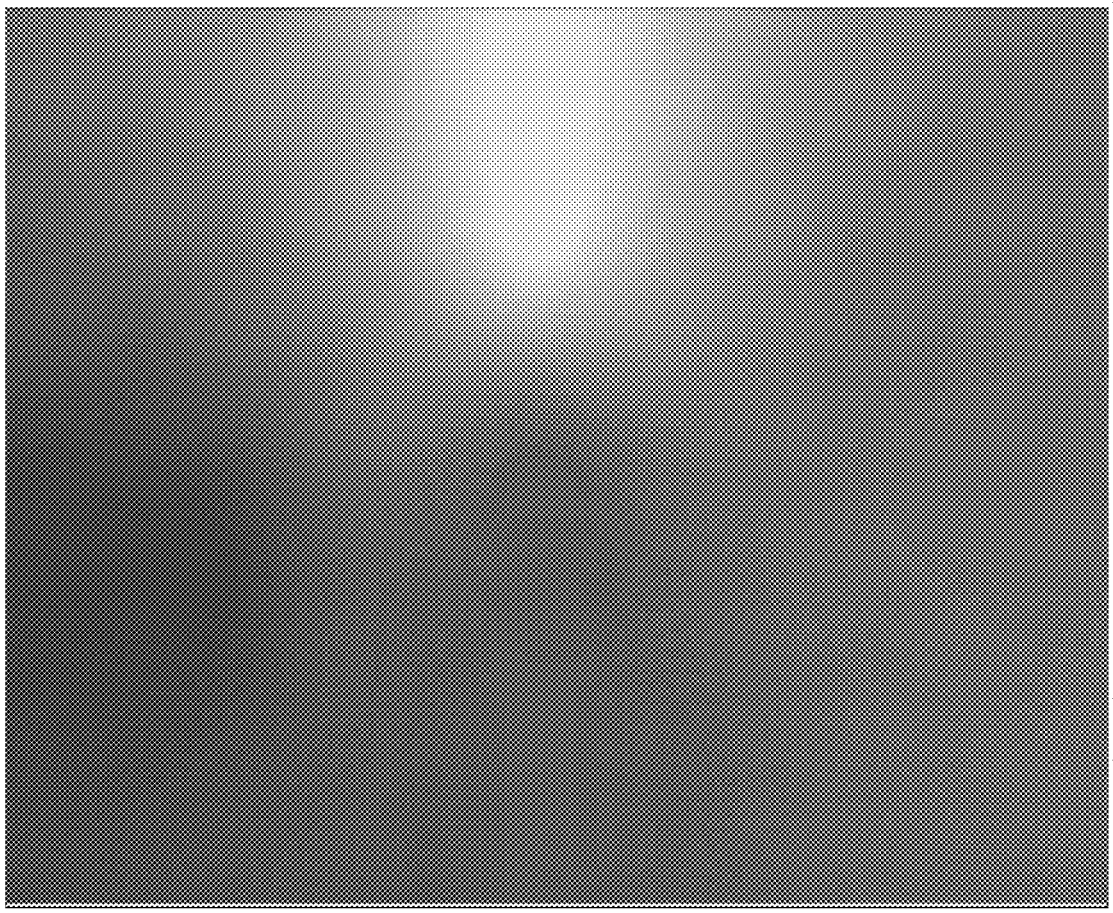
FIG. 3 is an illustration of an image with the undefined pixels filled in by recursively averaging the values of any adjacent defined pixels.

FIG. 3 shows one example of a user interface 129 (FIG. 1) according to certain embodiments of the present disclosure that is rendered on the display 116. The user interface 129 shown in FIG. 3 includes a version of the image 126 that has been modified by the interpolation application 123 (FIG. 1) to fill in the undefined pixels 143 (FIG. 1) of the original image 126 (as shown in FIG. 2) with recursively averaged values of any adjacent defined pixels 139 (FIG. 1) as discussed above. As shown in FIG. 3, the undefined pixels 143 of the original image 126 as shown in FIG. 2 are recursively replaced with any defined pixels 139 adjacent to the undefined pixels 143 thereby creating a modified image 126 with a seamless composition of only defined pixels 139.

Figure 4:
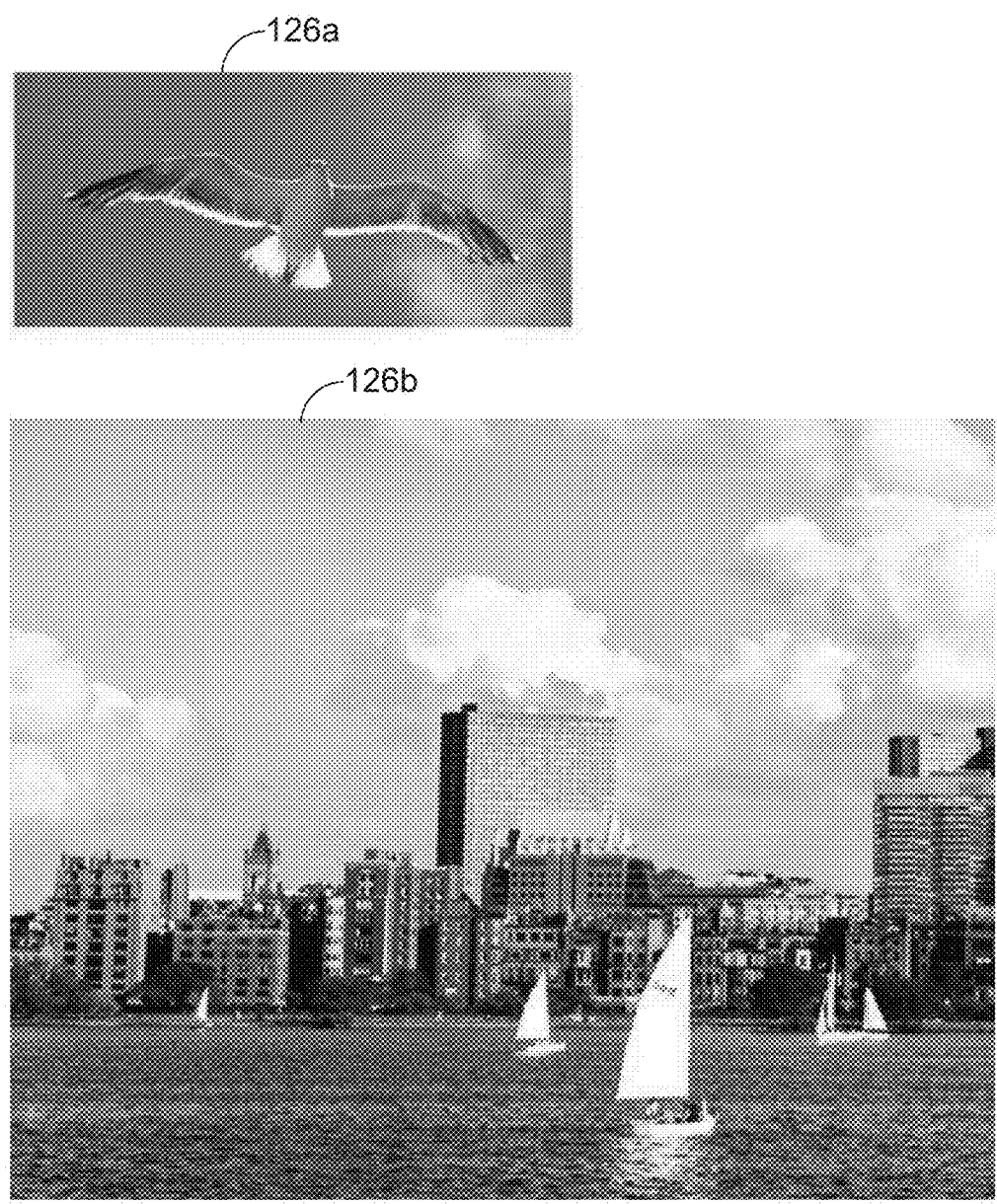
FIG. 4 is an illustration of a first image and a second image having different background colors that may be blended together to create a seamless transition according to certain embodiments described herein.

FIG. 4 shows one example of a user interface 129 (FIG. 1) according to certain embodiments of the present disclosure that is rendered on the display 116. The user interface 129 shown in FIG. 4 depicts a first image 126a and a second image 126b where the first image 126a may be pasted onto the second image 126b. The first image 126a depicts a bird and a background having a first shade of blue. The second image 126b depicts a skyline and a background having a second shade of blue. According to certain embodiments described herein, the interpolation application 123 may paste the first image 126a onto the second image 126b while blending the differences in the first shade of blue in the first image 126a and the second shade of blue in the second image 126b via the interpolation application 123 (FIG. 1) to create a modified image 126 having a seamless composition of blue. The modified image 126 includes the bird of the first image 126a with a background that smoothly transitions into the background of the second image 126b.

Figure 5:
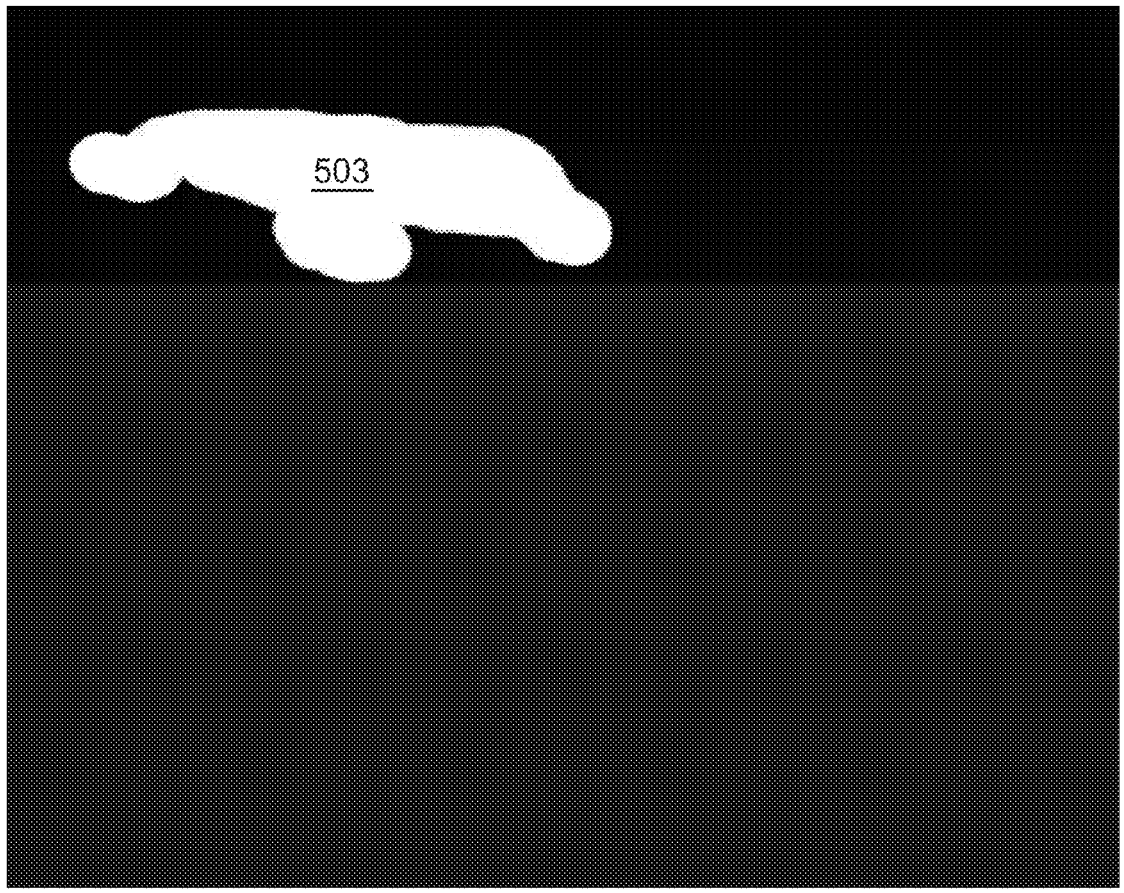
FIG. 5 is an illustration of a relevant portion of the first image to be inserted onto the second image.

FIG. 5 illustrates a portion of the first image 126a (FIG. 1) that is extracted for pasting on top of the second image 126b (FIG. 4). In one embodiment, a user operating the computing device 103 (FIG. 1) may specify a portion 503 of the first image 126a to be extracted via one or more I/O devices 119 (FIG. 1) and the user interface 129 (FIG. 1). For instance, the user may select the boundary of the portion 503 via a mouse, a stylus, a touch screen display associated with the computing device 103, and/or any other input device 119. In one embodiment, the interpolation application 123 (FIG. 1) may receive the portion 503 specified by the user and extract the specified portion 503 to implement the pasting operation, as will be described with respect to FIG. 6.

Figure 6:
FIG. 6 is an illustration of the first image and the second image together with two different background colors having been seamlessly blended together according to certain embodiments disclosed herein.

FIG. 6 illustrates the modified second image 126*b* with the portion 503 extracted from the first image 126*a* (FIG. 4) pasted on top of the second image 126*b*. As shown in FIG. 6, the interpolation application 123 (FIG. 1) produced the modified second image 126*c* with the background of the portion 503 (FIG. 5) of the first image 126*a* blended in a smooth transition with the background of the second image 126*b*. In one embodiment, the interpolation application 123 pastes the extracted portion 503 from the first image 126*a* on top of the original second image 126*b*. For example, the interpolation application 123 may paste the extracted portion 503 by implementing any number of standard pasting operations known in the art. The interpolation application 123 may then identify a boundary between pasted portion 503 and the second image 126*b*. In one embodiment, the interpolation application 123 identifies the boundary based at least in part on a color differential between the background of the extracted portion 503 and the background of the second image 126*b*. For instance, the interpolation application 123 may determine if the color differential between two adjacent pixels exceeds a predetermined threshold value. If the color differential exceeds the predetermined threshold value, then the interpolation application 123 may determine that the two adjacent pixels form the boundary.

Next, the interpolation application 123 produces the modified second image 126*c* with a seamless transition between the background of the original second image 126*b* and the background of the first image 126*a*. In one embodiment, the interpolation application 123 identifies the boundary between the original second image 126*b* and the first image 126*a*, and a surrounding portion of the boundary, to implement the approach described herein for creating the seamless composition depicted in FIG. 6. The interpolation application 123 may identify the shade of blue in the background of the first image 126*a* to be the undefined pixels 143 and the shade of blue in the background of the original second image 126*b* to be the defined pixels 139. Then, the interpolation application 123 recursively down samples the boundary and the surrounding portion of the boundary by a factor. For example, the interpolation application 123 may recursively down sample by a factor of two and/or any other factor, as described above. Upon recursively down sampling until computing a down sampled image 149 that includes no undefined pixels 143, the interpolation application 123 recursively up samples and implements the over function until all of the down sampled images 149 are processed. The resulting modified image 126*c* shown in FIG. 6 represents a seamless composition where the first shade of blue of the first image 126*a* is indistinguishable from the second shade of blue of the second image 126*b*.

Figure 7:
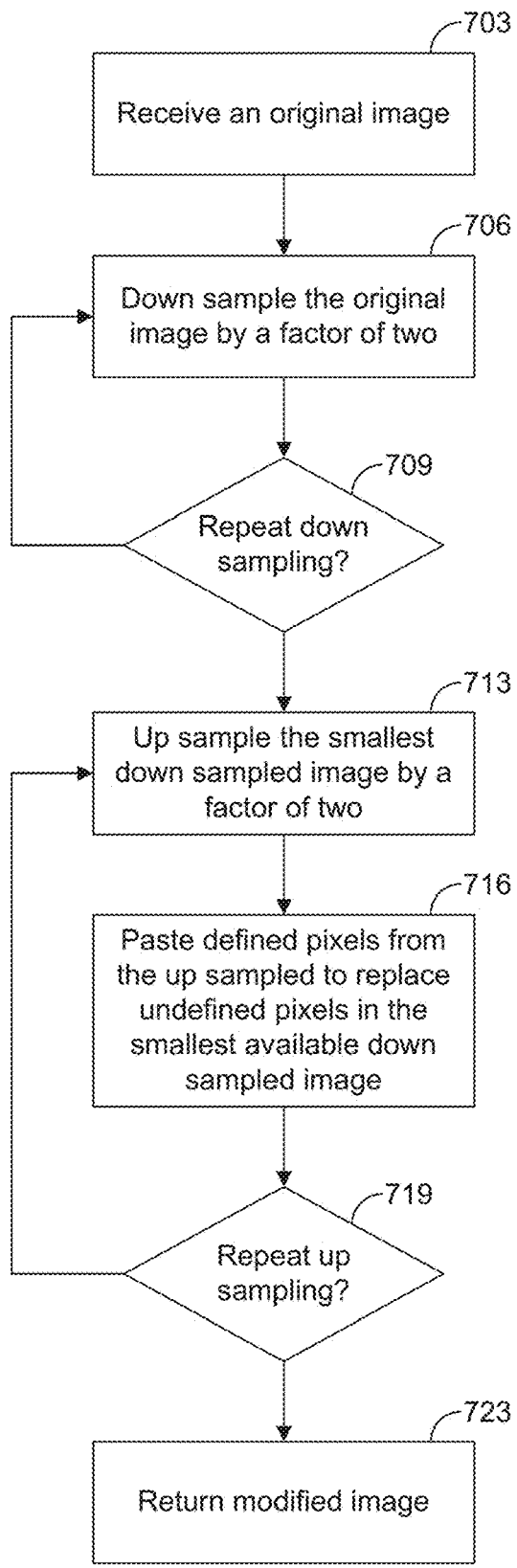
FIG. 7 is a flowchart illustrating an exemplary method for creating a seamless transition between defined regions, thereby filling in the undefined regions using defined portions of an image.

FIG. 7 is a flowchart that provides one example of the operation of a portion of the interpolation application 123 according to certain embodiments. It is understood that the flowchart of FIG. 7 provides merely an example of the many different types of functional arguments that may be employed to implement the operation of the portion of the interpolation application 123 as described herein. As an alternative, the flowchart of FIG. 7 may be viewed as depicting an example of steps of a method implemented in the computing device 103 (FIG. 1) according to one or more embodiments.

Beginning with step 703, the interpolation application 123 receives an image 126 (FIG. 1) having a number of undefined pixels 143 (FIG. 1) and a number of defined pixels 139 (FIG. 1). The interpolation application 123 fills in the undefined pixels 143 by recursively averaging the values of any adjacent defined pixels 139 to produce a modified image 126*a*. To this end, the interpolation application 123, in step 706, down samples the original image 126 by a factor of two to produce a first down sampled image 149 (FIG. 1) that is half the resolution 146 (FIG. 1) of the original image 126. For example, the interpolation application 123 may use every other pixel of the original image 126 to create the first down sampled image 149. In another embodiment, the interpolation application 123 may reduce the original image 126 by a different factor.

Next, in step 709, the interpolation application 123 determines whether to repeat the down sampling. In one embodiment, the interpolation application 123 determines whether there are any undefined pixels 143 in the down sampled image. If the interpolation application 123 determines that the down sampled image includes undefined pixels 143, then the interpolation application 123 returns to step 706 to down size image again. For example, the interpolation application 123 down sizes the first down sampled image 149 by a factor of two to create a second down sampled image 149. In another embodiment, the interpolation application 123 determines whether to repeat the down sampling based on the size of the down sampled image. For example, if the interpolation application 123 determines that the size of the down sampled image is large than 1×1, then the interpolation application 123 returns to step 706 to down sample the down sampled image 149. Additionally, the interpolation application 123 may store each down sampled image 149 at each recursive instance.

If the interpolation application 123 determines that the down sampling does not need to be repeated (i.e., the recursive down sampling may stop), then the interpolation application 123 advances to step 713. In step 713, the interpolation application 123 up samples the down sampled images 149 from the smallest down sampled image 149. For example, the interpolation application 123 up samples the down sampled images 149 by a factor of two, as discussed above, to create an up sampled image 153 (FIG. 1). Then in step 716, the interpolation application 123 pastes the next smallest down sampled image 149 on top of the up sampled image 153 and replaces any undefined pixels 143 in the next smallest down sampled image 149 with the corresponding defined pixels 139 of the up sampled image 153. For example, an over( ) function may implement this technique to create a modified up sampled image 153.

In step 719, the interpolation application 123 determines whether to repeat the up sampling. For example, the interpolation application 123 may determine to repeat the up sampling if there are remaining down sampled images 149 that can be processed. If the interpolation application 123 determines to repeat the up sampling, then the interpolation application 123 returns to step to repeat the up sampling. If the interpolation application 123 determines that the up sampling does not need to be repeated, then the interpolation application 123 advances to step 723 and returns the last modified up sampled image 153. The returned image will be a modified version of the original image 126 with the undefined pixels 143 filled in with recursively averaged adjacent defined pixels 139.

Figure 8:
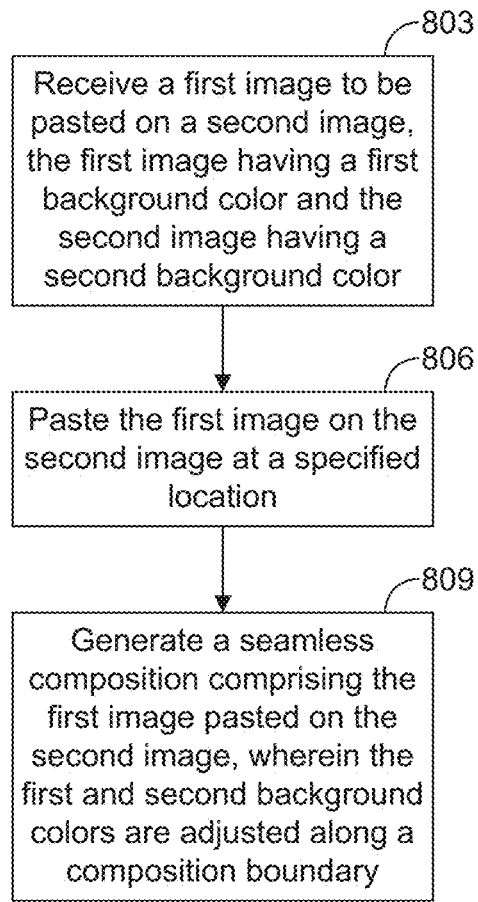
FIG. 8 is a flowchart illustrating another exemplary method for creating a seamless transition between defined regions, thereby filling in the undefined regions using defined portions of an image.

FIG. 8 is a flowchart that provides one example of the operation of a portion of the interpolation application 123 according to certain embodiments. It is understood that the flowchart of FIG. 8 provides merely an example of the many different types of functional arguments that may be employed to implement the operation of the portion of the interpolation application 123 as described herein. As an alternative, the flowchart of FIG. 8 may be viewed as depicting an example of steps of a method implemented in the computing device 103 (FIG. 1) according to one or more embodiments.

Beginning at step 803, the interpolation application 123 receives a first image that is to be pasted on a second image. The first image has a first background color and the second image has a second background color. In one embodiment, a user may provide the first image and the second image via a user interface 129 (FIG. 1) rendered on a display 116 (FIG. 1) of a computing device 103 (FIG. 1). Then, in step 806, the interpolation application 123 pastes the first image on the second image at a specified location. For instance, the user may have indicated a location on the second image at which to paste the first image via one or more input devices 119 (FIG. 1).

In step 809, the interpolation application 123 generates a seamless composition comprising the first image pasted on the second image. In one embodiment, the interpolation application 123 identifies a set of pixels along a composition boundary between the first image and the second image to be defined pixels and another set of pixels to be undefined pixels. For example, the defined pixels may correspond to the second background color and the undefined pixels may correspond to the first background color. The interpolation application 123 then recursively down samples the boundary portion by a sampling factor to produce a plurality of down sampled boundary portions until the down sampled boundary portion produced at the recursive down sampling instance lacks defined pixels. The interpolation application 123 then recursively up samples each one of the down sampled boundary portions by the sampling factor to create an up sampled image from the respective down sampled boundary portion. Then, at each recursive up sampling instance, the interpolation application 123 pastes the next recursively occurring down sampled boundary portion on the up sampled image to create the next recursively occurring boundary portion for the up sampling.

Figure 9:
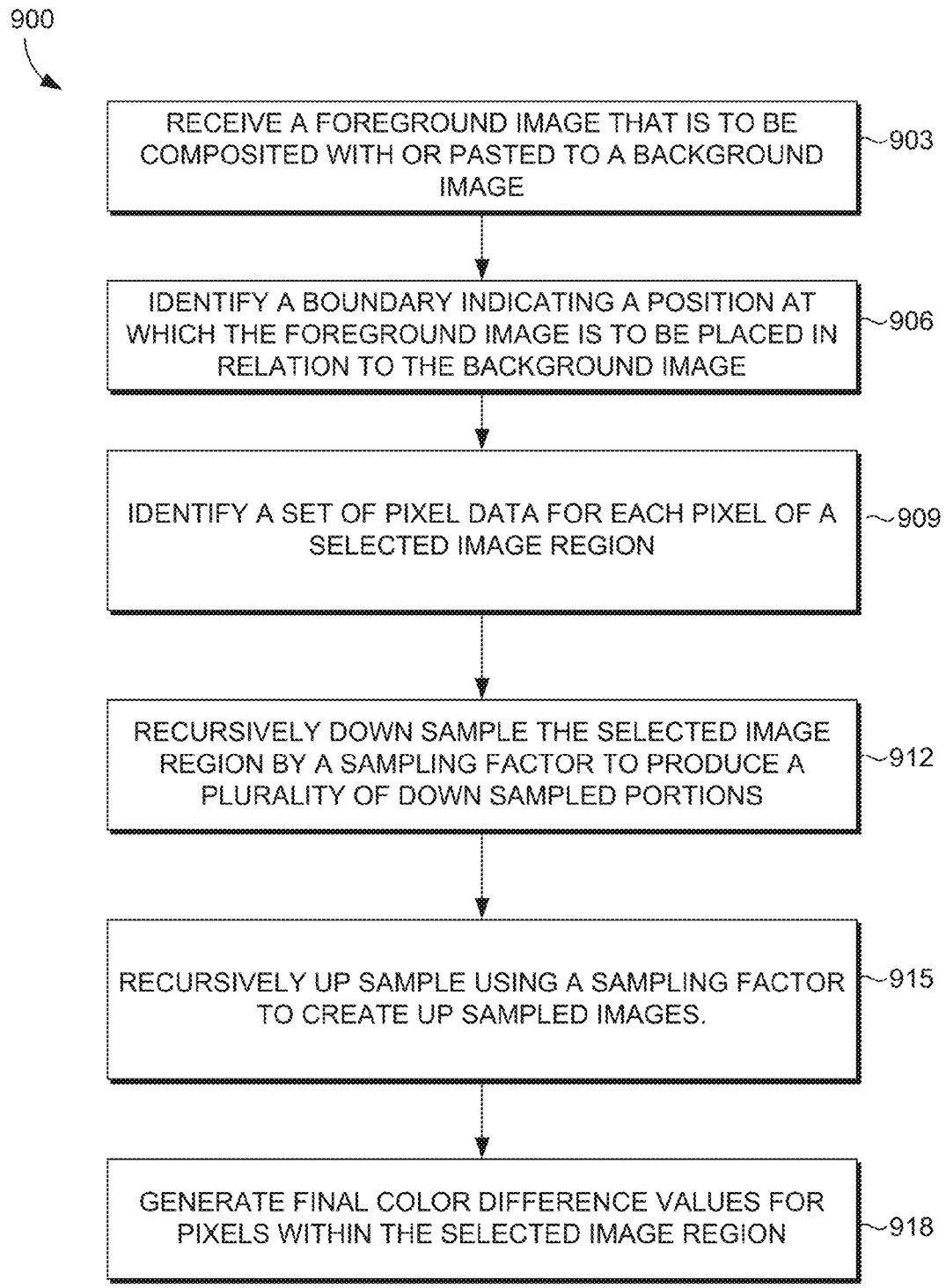
FIG. 9 is a flowchart illustrating another exemplary method for creating a seamless transition between images, in accordance with embodiments described herein.

FIG. 9 is a flowchart that provides one example of the operation of a portion of the interpolation application 123 according to certain embodiments. It is understood that the flowchart of FIG. 9 provides merely an example of the many different types of functional arguments that may be employed to implement the operation of the portion of the interpolation application 123 as described herein. As an alternative, the flowchart of FIG. 9 may be viewed as depicting an example of steps of a method implemented in the computing device 103 (FIG. 1) according to one or more embodiments.

Beginning at step 903, the interpolation application 123 receives a foreground image that is to be composited with or pasted to a background image. Generally, the foreground image refers to an image that is to be incorporated with the background image. Foreground and background images can be referred to more generally as a first image and a second image, but foreground and background image are generally used in this example to provide more clarity. A foreground and/or background image can be selected in any manner, and embodiments described herein are not intended to be limited in any manner. For example, in some cases, a background and foreground image may be selected by a user desiring to generate or view a composite image. In one embodiment, a user may provide or select the background image and foreground image via a user interface 129 (FIG. 1) rendered on a display 116 (FIG. 1) of a computing device 103 (FIG. 1).

At step 906, a boundary or border indicating a position (e.g., edge or periphery) at which the foreground image is to be placed or arranged in relation to the background image is identified. The boundary generally indicates a region in association with a background image at which a foreground image is desired to be pasted or composited. A boundary may be of any shape and/or size. For example, the boundary may correspond with the shape or outline of the foreground image. As another example, the boundary may be of rectangular shape that bounds a foreground image (which may be of any shape). A boundary can be designated or selected in any number of manners. In some cases, a boundary location may be indicated by a user that selects or otherwise indicates the boundary. For instance, a foreground image may be dragged or moved to a location on the background image, the position at which is used to generate the boundary.

By way of example, and with reference to FIG. 5, in one embodiment, the interpolation application 123 may position the portion 503 from the first image 126a on top of the original second image 126b (e.g., in accordance with a user selection or indication). The interpolation application 123 may then identify a boundary between positioned portion 503 and the second image 126b. In some cases, the boundary might be determined based at least in part on a color differential between the background of the portion 503 and the background of the second image 126b (e.g., color differential exceeds a predetermined threshold value).

At step 909, a set of pixel data for each pixel of a selected image region is identified. A selected image region generally refers to an area or region on which to operate or modify pixel colors such that the background and foreground images can blend smoothly. Stated differently, a selected image region refers to a pixel area or region in which a color or filter effect (e.g., gradual effect) can be applied to an image. In some embodiments, a selected image region is defined by a boundary or a selected image region defines the boundary. In this regard, a selected image region can refer to the area exterior to the boundary and/or interior to the boundary. Although generally described herein as identifying a set of pixel data for pixels of a selected image region, it can be appreciated that pixel data can be identified for any set of pixels, for example, included within a background image and/or foreground image. A selected image region can be designated or determined in any number of manners. For example, upon a user positioning a foreground image over a background image, the location of the foreground image (e.g., in association with a boundary of the foreground image) may be used to identify a selected image region.

In some embodiments, a set of pixel data associated with a pixel includes color difference components and a color difference indicator. A color difference component refers to component or channel that indicates an extent of difference in color between corresponding pixels in images, such as a foreground image and a background image. A color difference can be represented using any value (e.g., numerical value) and can be determined in any manner and is not intended to be limited to examples provided herein. A color difference can represent color differences in accordance with any color model. For example, a color difference between a pixel associated with a background image and a corresponding pixel associated with a foreground image based on a RGB color model may include a red color difference between the pixels, a green color difference between the pixels, and a blue color difference between the pixels. Another example of a color model is CYMK that includes cyan, magenta, yellow, and black. Color models can include any number of color components, such as one, two, three, or four color values or components. As such, a color difference can include three or four channels or components that correspond with the represented colors. A color difference indicator can be an indicator that indicates whether a particular pixel includes known color difference information. In this regard, a color difference indicator can indicate whether a pixel is a defined pixel with regard to known color difference information. In some cases, a color difference indicator associated with a pixel may initially be a 0 representing no information or a 1 representing some information, as described below.

In some embodiments, for each pixel corresponding with the boundary, a color difference between the background image and the foreground image is determined. In some cases, the boundary might be defined by a set of pixels. In such cases, color differences between the background image and the foreground image at the same point along the boundary represented by pixels are determined. In other cases, pixels corresponding with the boundary might be identified, such as pixels adjacent to the interior portion of the boundary or pixels adjacent to the exterior portion of the boundary. Irrespective of the boundary, a same or matching pixel location of both the foreground image and background image are identified such that a color difference between the image pixels can be determined.

In accordance with determining color difference components (e.g., a red color difference component, a green color difference component, and a blue color difference component), a color difference indicator can be identified indicating that the pixel is a defined pixel, that is, includes color difference information. In this regard, the interpolation application 123 can identify a set of pixels along a composition boundary, for example, associated with a selected image region, to be defined pixels in accordance with existing or contemplated color difference information associated with such pixels. In some such cases, the color difference indicator for these pixels can be initial set to 1. For each non-boundary pixel, a color difference may not be generated. As such, the set of pixel data associated with such pixels may generally be defined by zero values, including the color difference indicator.

As described in more detail below, color differences between corresponding pixels of the foreground and background images along the boundary can be interpolated from the boundary throughout other portions of the selected image region, such as from the boundary to the inner portion of the selected image region. In other words, the color differences determined for pixels along the boundary are used to propagate color change through the selected image region (e.g., inward).

At step 912, the interpolation application 123 recursively down samples or collapses the selected image region by a sampling factor (e.g., 2) to produce a plurality of down sampled portions. Initially, the set of pixel data associated with the pixels of the selected image region determined at step 909 can be designated as pixel data associated with level 0. As described, the set of pixel data for a pixel may include color difference components and a color difference indicator. For example, an example set of initial pixel data for a pixel position may be $\{R_v, G_v, B_v, 1\}$ or $\{R_v, G_v, B_v, 0\}$, where $R_v$ represents a red color difference value, $G_v$ represents a green color difference value, $B_v$ represents a blue color difference value, 1 represents color differences are included or defined, and 0 represents that color differences are undetermined, unknown, or undefined (in which case the color difference values $R_v$, $G_v$, $B_v$ would also equal 0). The function for the original or level 0 selected image region with color difference components and a color difference indicator can be described as follows:

pyramid_level[0]=
if (on_border) $(R_f-R_b, G_f-G_b, B_f-B_b, 1)$
else (0, 0, 0, 0)

wherein the color value differences are computed based on the foreground color minus the background color (e.g., $R_f-R_b, G_f-G_b, B_f-B_b$).

The original selected image region, as represented by color difference components and a color difference indicator, can be down sampled by a factor, such as two, to produce a first down sampled image that is a portion (e.g., half) of the resolution of the original selected image region. As can be appreciated, in down sampling, color difference indicators are generated for pixels of the first down sampled image. By way of example only, assume that a set of four pixels is being reduced to one pixel. Further assume that three of the four pixels do not correspond with a boundary and, as such, include a zero-value color difference indicator and that one of the four pixels does correspond with a boundary and, as such, includes a one-value color difference indicator. In such a case, the color difference indicators are aggregated or averaged to derive a color difference indicator of 0.25 for the pixel in the down sampled image. The computed color difference indicator of 0.25 indicates the number of pixels with color difference information that were used to compute the value (e.g., 25% of pixels used to compute result include some color difference information).

In accordance with generating each of the new color difference indicators for the various pixel positions of the first down sampled image, the greatest or largest color difference indicator value can be identified. In this manner, the value associated with the largest amount of color difference information available on the particular down sampled level (e.g., the first down sampled image) is identified. For each pixel of the first down sampled image, the color difference values (e.g., RGB component values) and the color difference indicators can then be divided by the greatest color difference indicator value. Such a process renormalizes the data in accordance with the maximum indication of color difference information. For example, assume that four pixels associated with the first down sampled image include data sets of {0.3, 0.4, 0.5, 0.33}, {0.2, 0.6, 0.4, 0.31}, {0.37, 0.11, 0.12, 0.21}, and {0.29, 0.30, 0.31, 0.12}. In such a case, the maximum or greatest color difference indicator equals 0.33. As such, each of the color differences and color difference indicators is divided by 0.33 to renormalize the data at this down sampled level. Normalizing data at each down sampled level or instance facilitates a seamless and gradual transition between images.

In some cases, each of the components or values can also be multiplied by a factor to further effectuate normalization such that the information associated with the down sampled level contributes more to the final result. As can be appreciated, any number can be used to augment the normalization. For example, in some cases, a factor of two may be a predetermined or designated factor by which to multiply the color differences and color difference indicators associated with the first down sampled image. In some embodiments, the resulting values (e.g., upon being multiplied by a specified value) should remain under a value of one. In such cases, the factor (e.g., a predetermined factor) may be reduced if needed to maintain color difference values less than one or the resulting value may be reduced to one or below if the multiplication of the color differences by the factor results in a value higher than one. The function for down sampling selected image regions can be described as follows for down sampled level l=1 to n_levels:

pyramid_level[l]=reduce_size_by_half(pyramid_level[l−1])
    max_alpha=max(pyramid_level[l][4])
    pyramid_level[l]/=max_alpha
    pyramid_level[l]*=min(some_factor, 1/pyramid_level[l][4]),
    wherein [4] refers to color difference indicator component The down sampling process can continue through any number of down sampling levels l. In some cases, the down sampling process continues until the down sampled image includes one pixel. In other cases, the down sampling process continues until color difference information is included for each pixel of the down sampled image. In this regard, down sampling continues until the color difference indicator values associated with each of the pixels of the down sampling levels is a non-zero value. A level at which no color difference indicator values are zero can be dynamically determined, predetermined, or inferred.

At step 915, the interpolation application 123 recursively performs up sampling using a sampling factor to create up sampled images. The sampling factor may be any value and generally corresponds with a sampling factor used to down sample images such that up sampled images correspond with a down sampled level. For example, the interpolation application 123 up samples the smallest down sampled images 149 by a factor of two, as discussed above, to create an up sampled image 153 (FIG. 1). The up sampled images will have a corresponding down sampled image that is at the same pyramid level (e.g., a same number of pixels or resolution). Generally, the up sampled image and down sampled image corresponding with one another include the same number of pixels. As such, two sets of pixel data associated with a pixel will exist at each level, one associated with down sampling and one associated with up sampling.

In some embodiments, the two sets of pixel data can be combined to generate an optimal blending, or merged data set. In some cases, when a pixel associated with a down sampled image is not associated with color difference information (e.g., the color difference indicator has a 0 value), the data associated with the up sampled image can be maintained as the up sampled image data (e.g., color difference information). In cases that corresponding versions or sets of pixel data both have some color difference information (a non-zero value), data might be selected in connection with one of the versions, or the data might be blended or combined, for example, using a weighted average of a value and (1−value). In embodiments, the value used for the weighted average to blend the data is the color difference indicator, for example, associated with the up sampled image. In some cases, the blended data is used as a basis for up sampling to the next level.

A function for up sampling images can be described as follows for level l=n_levels−1 to 0 and expanded_level=reduced_level[n_levels]
    expanded_level=double_size(expanded_level)
    expanded_level=combine(expanded_level, reduced_level[l]), wherein
    alpha=reduced_level[l][4], and
    expanded_level[l]=(1−alpha)*expanded_level[l]+alpha*reduced_level[l], wherein [4] refers to color difference indicator component.

The up sampling process can continue through any number of up sampling levels until a final up sampled image is generated. In some cases, the up sampling process continues until there are no further corresponding down sampled images 149. That is, up sampling is complete when the up sampled image has the same resolution as the original image used to begin down sampling (a final up sampled image). As can be appreciated, although up sampling and blending is generally described in reference to the color difference indicator, such functions may apply to other data within the sets of data, such as red color difference, blue color difference, and green color difference.

At step 918, the final color difference values for pixels within the selected image region are generated. In some cases, each of the color value differences (e.g., RGB) of the final up sampled image can be divided by the color difference indicator associated therewith. For example, assume that a pixel associated with the final up sampled image includes RGB color difference data and a color difference indicator of {0.23, 0.22, 0.21, 0.18}. In such a case, the RGB color difference data is divided by the color difference indicator or 0.18. These derived final color difference values for pixels within the selected image region can then be subtracted from the foreground value to generate a smooth blend or transition between colors. In this regard, the modified foreground equals the foreground minus the result of pyramid manipulations. The modified foreground pixels can be smoothly blended or incorporated into the background image. In some cases, the appropriate background pixels are replaced by the modified foreground pixels. As such, the border foreground is generally the same color as the background image.

Figure 10:
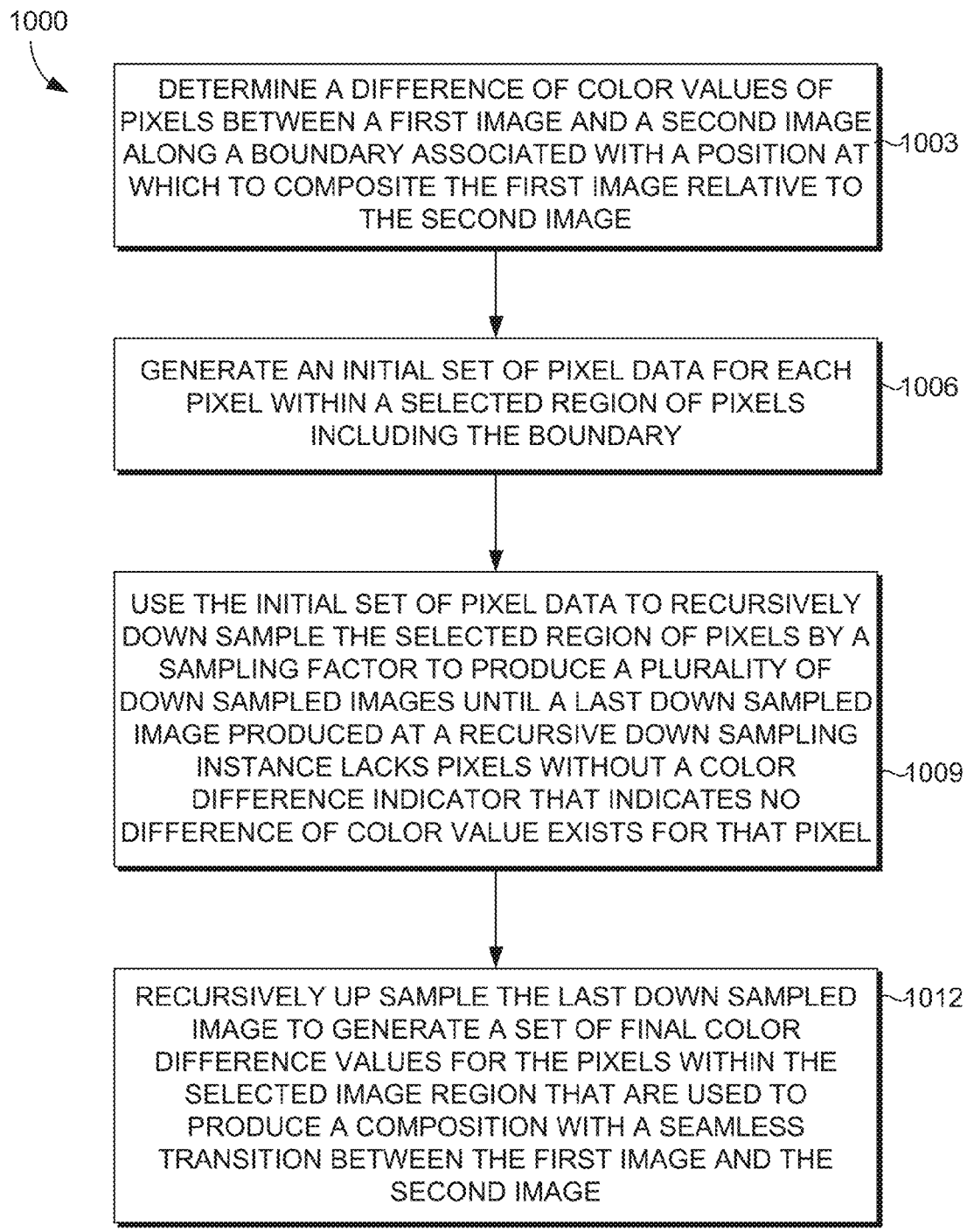
FIG. 10 is a flowchart illustrating another exemplary method for creating a seamless transition between images, in accordance with embodiments described herein.
Figure 11:
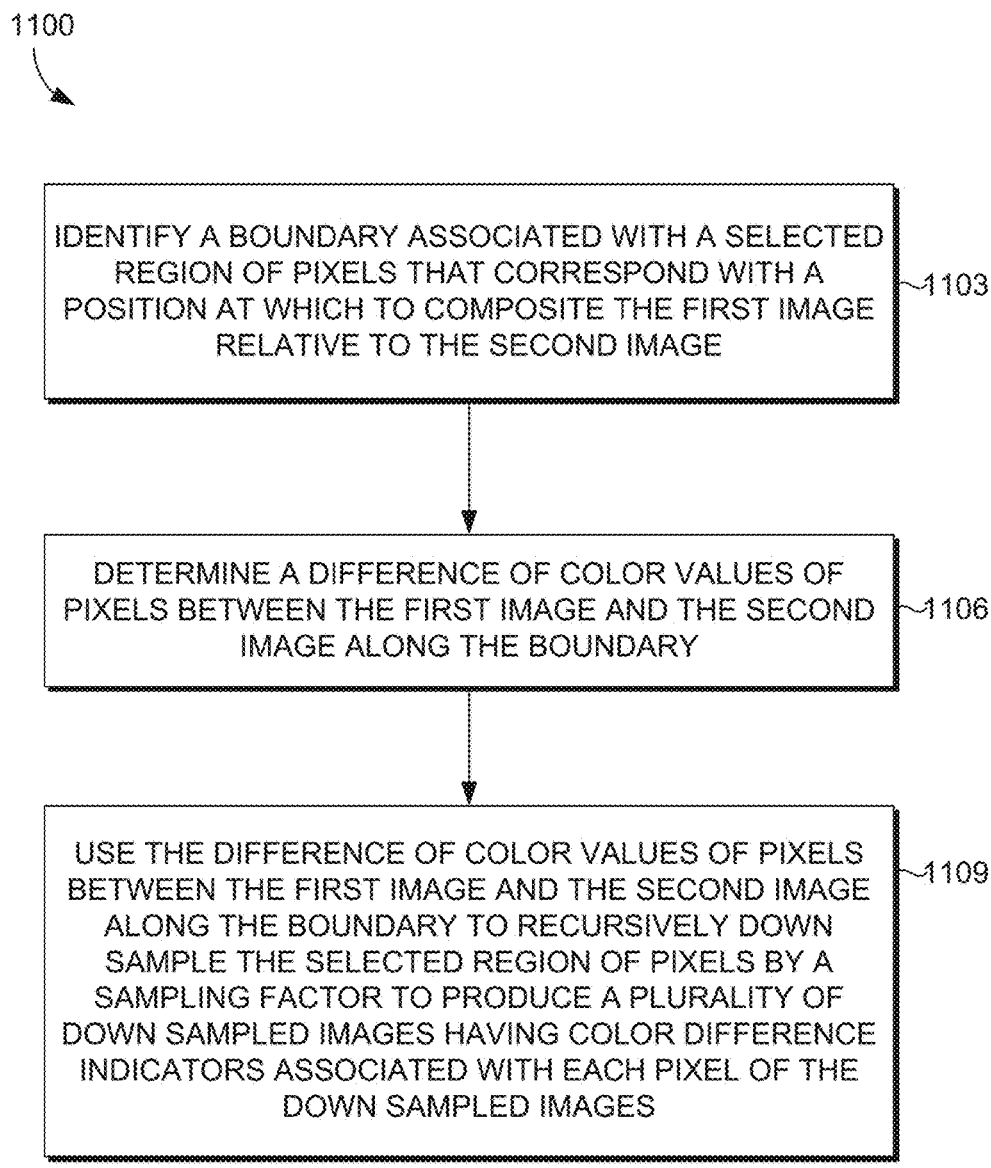
FIG. 11 is a flowchart illustrating another exemplary method for creating a seamless transition between images, in accordance with embodiments described herein.

FIGS. 10 and 11 are flowcharts that provide further examples of the operation of a portion of the interpolation application 123 according to certain embodiments described with respect to FIG. 9. It is understood that the flowcharts of FIGS. 10 and 11 provide merely examples of the many different types of functional arguments that may be employed to implement the operation of the portion of the interpolation application 123 as described herein. As an alternative, the flowcharts of FIGS. 10 and 11 may be viewed as depicting an example of steps of a method implemented in the computing device 103 (FIG. 1) according to one or more embodiments.

Turning to FIG. 10 in particular, at step 1003, a difference of color values of pixels between a first image and a second image are determined along a boundary associated with a position at which to composite the first image relative to the second image. At step 1006, an initial set of pixel data for each pixel within a selected region of pixels including the boundary are generated. In embodiments, each set of pixel data for the pixels along the boundary include one or more color difference components representing a difference in color of the pixel between the first image and the second image based on the determined difference of color values of pixels, and a color difference indicator that indicates that a difference of color value exists for that pixel. Each set of pixel data for pixels not along the boundary include zero values for the one or more color difference components and for the color difference indicator.

At step 1009, the initial set of pixel data is used to recursively down sample the selected region of pixels by a sampling factor to produce a plurality of down sampled images until a last down sampled image produced at a recursive down sampling instance lacks pixels without a color difference indicator that indicates no difference of color value exists for that pixel. In embodiments, each down sampling instance comprises identifying a largest color difference indicator, and dividing each color difference component and color difference indicator associated with the corresponding down sampled image by the largest color difference indicator. At step 1012, the last down sampled image is recursively up sampled to generate a set of final color difference values for the pixels within the selected image region that are used to produce a composition with a seamless transition between the first image and the second image.

Turning now to FIG. 11, at step 1103, a boundary associated with a selected region of pixels that correspond with a position at which to composite the first image relative to the second image is identified. At step 1106, a difference of color values of pixels between the first image and the second image is determined along the boundary. At step 1109, the difference of color values of pixels between the first image and the second image along the boundary are used to recursively down sample the selected region of pixels by a sampling factor to produce a plurality of down sampled images having color difference indicators associated with each pixel of the down sampled images. Such color difference indicators indicate whether a difference of color value exists for corresponding pixel is normalized in association with each recursively down sampled image.

As described, embodiments herein facilitate controlling smoothness of transitions between images. In one embodiment, a computer-implemented method for compositing a first image and a second image with a seamless transition is provided. A difference of color values of pixels between a first image and a second image is determined along a boundary associated with a position at which to composite the first image relative to the second image. An initial set of pixel data is generated for each pixel within a selected region of pixels including the boundary, each set of pixel data for the pixels along the boundary including one or more color difference components representing a difference in color of the pixel between the first image and the second image based on the determined difference of color values of pixels, and a color difference indicator that indicates that a difference of color value exists for that pixel. The initial set of pixel data is used to recursively down sample the selected region of pixels by a sampling factor to produce a plurality of down sampled images until an extent of pixels of a last down sampled image, produced at a recursive down sampling instance, correspond with color difference indicators indicating existing differences of color values. The last down sampled image is recursively up sampling to generate a set of final color difference values for the pixels within the selected image region that are used to produce a composition with a seamless transition between the first image and the second image.

In another embodiment, a computer-implemented method for compositing a first image and a second image with a seamless transition between the first image and the second image is provided. The method includes identifying a boundary associated with a selected region of pixels that correspond with a position at which to composite the first image relative to the second image. The method also includes determining a difference of color values of pixels between the first image and the second image along the boundary. The method further includes using the difference of color values of pixels between the first image and the second image along the boundary to recursively down sample the selected region of pixels by a sampling factor to produce a plurality of down sampled images, wherein each pixel of the down sampled images corresponds with a color difference indicator that indicates whether a difference of color value exists for the pixel.

In yet another embodiment, a system comprising a processor for executing instructions stored in computer-readable medium on one or more devices, the instructions comprising one or more modules is provided. The instructions configured to identify a difference of color values of pixels between a foreground image and the background image along a boundary associated with a location at which to paste the foreground image relative to the background image; and recursively down sampling a region of pixels within the boundary by a sampling factor to produce a plurality of down sampled images having color difference indicators associated with each pixel of the down sampled images, wherein the color difference indicators indicate whether a difference of color value exists for the corresponding pixel.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

Having thus described the invention, what is claimed is:

1. A computer-implemented method for compositing a first image and a second image with a seamless transition, the method comprising:
    determining a difference of color values of pixels between a first image and a second image along a boundary associated with a position at which to composite the first image relative to the second image;
    generating an initial set of pixel data for each pixel within a selected region of pixels including the boundary, each set of pixel data for the pixels along the boundary including:
        one or more color difference components representing a difference in color of the pixel between the first image and the second image based on the determined difference of color values of pixels, and
        a color difference indicator that indicates that a difference of color value exists for that pixel;
    using the initial set of pixel data to recursively down sample the selected region of pixels by a sampling factor to produce a plurality of down sampled images until an extent of pixels of a last down sampled image, produced at a recursive down sampling instance, correspond with color difference indicators indicating existing differences of color values;
    recursively up sampling the last down sampled image to generate a set of final color difference values for the pixels within the selected image region; and
    producing a composition with a seamless transition between the first image and the second image using the set of final color difference values for the pixels within the selected image region.

2. The method of claim 1, wherein the selected region of pixels include pixels within the boundary.

3. The method of claim 1, wherein the color difference components representing a difference in a red color, a difference in a green color, and a difference in a blue color.

4. The method of claim 1, wherein each down sampling instance comprises:
    identifying a largest color difference indicator,
    dividing each color difference component and color difference indicator associated with the corresponding down sampled image by the largest color difference indicator, and
    multiplying each color difference component and color difference indicator associated with the corresponding down sampled image by a predetermined factor.

5. The method of claim 1, wherein the first image comprises a foreground image, and the second image comprises a background image.

6. The method of claim 1, wherein the extent of pixels of a last down sampled image comprises each pixel of the last down sampled image.

7. The method of claim 1, wherein the set of final color difference values are generated by dividing each of the color value differences of a final up sampled image by a color difference indicator associated with the final up sampled image.

8. The method of claim 7, wherein the set of final color difference values are used to modify pixels of the first image.

9. A computer-implemented method for compositing a first image and a second image with a seamless transition between the first image and the second image, the method comprising:
    identifying a boundary associated with a selected region of pixels that correspond with a position at which to composite the first image relative to the second image;
    determining a difference of color values of pixels between the first image and the second image along the boundary;
    using the difference of color values of pixels between the first image and the second image along the boundary to recursively down sample the selected region of pixels by a sampling factor to produce a plurality of down sampled images, wherein each pixel of the down sampled images corresponds with a color difference indicator that indicates whether a difference of color value exists for the pixel; and
    producing a composition with a seamless transition between the first image and the second image using a set of final color difference values for the region of pixels within the boundary, wherein the set of final color difference values is generated based on recursively up sampling a last down sampled image.

10. The method of claim 9 further comprising normalizing the color difference indicators in association with each recursively down sampled image, wherein the normalizing comprises:
    identifying a largest color difference indicator from among the color difference indicators associated with the corresponding down sampled image, and
    dividing each of the color difference indicators associated with the corresponding down sampled image by the largest color difference indicator.

11. The method of claim 10, wherein the normalizing further comprises dividing each color difference component associated with the corresponding down sampled image by the largest color difference indicator.

12. The method of claim 10 further comprising augmenting the normalization by multiplying each color difference indicator by a predetermined factor.

13. The method of claim 11 further comprising augmenting the normalization by multiplying each color difference indicator and each color difference component by a predetermined factor.

14. The method of claim 10, wherein the difference of color values of pixels comprises a first difference representing a difference of a red color value, a second difference representing a difference of a green color value, and a third difference representing a difference of a blue color value.

15. A system comprising:
a processor for executing instructions stored in computer-readable medium on one or more devices,
the instructions comprising one or more modules configured to perform the steps comprising:
identifying a difference of color values of pixels between a foreground image and the background image along a boundary associated with a location at which to paste the foreground image relative to the background image;
recursively down sampling a region of pixels within the boundary by a sampling factor to produce a plurality of down sampled images having color difference indicators associated with each pixel of the down sampled images, wherein the color difference indicators indicate whether a difference of color value exists for the corresponding pixel; and
producing a composition with a seamless transition between the foreground image and the background image using a set of final color difference values for the region of pixels within the boundary, wherein the set of final color difference values is generated based on recursively up sampling a last down sampled image.

16. The system of claim 15 further comprises normalizing the color difference indicators in association with each recursively down sampled image, wherein the normalizing comprises:
identifying a largest color difference indicator from among the color difference indicators associated with the corresponding down sampled image, and
dividing each of the color difference indicators associated with the corresponding down sampled image by the largest color difference indicator.

17. The system of claim 16, wherein the normalizing is augmented by multiplying each color difference indicator by a predetermined factor.

18. The system of claim 15, wherein the difference of color values of pixels comprises a first difference representing a difference of a red color value, a second difference representing a difference of a green color value, and a third difference representing a difference of a blue color value.

* * * * *

UNITED STATES PATENT AND TRADEMARK OFFICE
CERTIFICATE OF CORRECTION

PATENT NO. : 10,049,435 B2
APPLICATION NO. : 15/160932
DATED : August 14, 2018
INVENTOR(S) : Sylvain Paris et al.

Page 1 of 1

It is certified that error appears in the above-identified patent and that said Letters Patent is hereby corrected as shown below:

On the Title Page

Item (54), and in the Specification, Column 1, Line 2 (Title): Please remove "TRANSMISSION" and replace with --TRANSITION--.

Signed and Sealed this
Eighteenth Day of June, 2019

Andrei Iancu
*Director of the United States Patent and Trademark Office*